United States Patent
Prestl

(10) Patent No.: US 6,304,811 B1
(45) Date of Patent: Oct. 16, 2001

(54) SYSTEM FOR CONTROLLING SPEED AND DISTANCE IN A MOTOR VEHICLE CHANGING TRAFFIC LANES

(75) Inventor: Willibald Prestl, Eichenau (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/581,945

(22) PCT Filed: Dec. 9, 1998

(86) PCT No.: PCT/EP98/07985

§ 371 Date: Aug. 29, 2000

§ 102(e) Date: Aug. 29, 2000

(87) PCT Pub. No.: WO99/32318

PCT Pub. Date: Jul. 1, 1999

(30) Foreign Application Priority Data

Dec. 20, 1997 (DE) ............................................. 197 57 063

(51) Int. Cl.[7] ................................. G06F 7/00; G06F 17/00
(52) U.S. Cl. ............................ 701/96; 701/117; 701/119; 701/301; 180/170; 340/435; 340/436; 340/903
(58) Field of Search .................................... 701/1, 93, 96, 701/117, 119, 301; 180/169, 167, 170, 271; 340/435, 436, 438, 901, 902, 903, 904, 905, 917, 933

(56) References Cited

U.S. PATENT DOCUMENTS 5,014,200   5/1991   Chundrlik et al. .
5,521,579 * 5/1996   Bernhard ................................ 340/438
5,871,062 * 2/1999   Desens et al. ......................... 180/169

FOREIGN PATENT DOCUMENTS

| 3622447  | 1/1988  | (DE) . |
|----------|---------|--------|
| 4200694  | 7/1993  | (DE) . |
| 4313568  | 6/1994  | (DE) . |
| 19514023 | 10/1996 | (DE) . |
| 19714726 | 11/1997 | (DE) . |
| 19720764 | 11/1997 | (DE) . |
| 19637245 | 3/1998  | (DE) . |
| 19637053 | 4/1998  | (DE) . |
| 19644379 | 4/1998  | (DE) . |
| 0443185  | 8/1991  | (EP) . |
| 0716949  | 6/1996  | (EP) . |

* cited by examiner

Primary Examiner—William A. Cuchlinkski, Jr.
Assistant Examiner—Gertrude Arthur
(74) Attorney, Agent, or Firm—Crowell & Moring LLP

(57) ABSTRACT

A system for distance-dependent control of the driving speed of a motor vehicle including the detection of a traffic lane change or intention to change traffic lane and a signal for estimating the mean speed of vehicles in a target lane. When a turn signal or intention to turn is detected, the control system defines the vehicle speed and/or distance to a vehicle driving ahead in the same lane and sets this defined vehicle speed to be equal to the estimated mean speed of vehicles in an adjacent lane.

8 Claims, 1 Drawing Sheet

SYSTEM FOR CONTROLLING SPEED AND DISTANCE IN A MOTOR VEHICLE CHANGING TRAFFIC LANES

BACKGROUND AND SUMMARY OF THE INVENTION

This application claims the priority of Germany application 19757063.1, filed on Dec. 20, 1997, the disclosure of which is expressly incorporated by reference herein.

The invention relates to a distance-dependent system for controlling the driving speed of a motor vehicle.

A driving speed control system of this type is known, for example, from U.S. Patent Document U.S. Pat. No. 5,014,200. Such known adaptive driving speed control systems consist particularly of two components. A cruise control system which can keep a speed constant which was defined by the driver; and a sensor system for detecting the distance to the respective vehicle driving ahead.

In the case of distance-dependent adaptive cruise control systems, a defined speed is always kept constant until a defined minimum distance has been reached from the vehicle driving ahead. In the event of a reaching of this defined minimum distance, a speed control takes place such that the defined minimum distance is maintained.

It is an object of the invention to provide a passing aid or lane change aid for a driving speed control system of the initially mentioned type which can reliably be adapted to respective actual driving situations.

The invention is based on the fact that, in the case of distance-dependent adaptive speed control systems, the distance sensor systems are capable of also detecting the traffic in the adjacent lanes. As a result of the intermediate statistical consideration of the adjacent traffic, an actual mean value of the speeds driven by adjacent traffic can be determined. A passing operation or a traffic lane change or an intention to change the lane can be determined, for example, by a turn signal, by a steering wheel rotation signal, by a lateral acceleration signal or by a yaw rate signal. Based on the value of the mean speed of the vehicles in the adjacent lane or in the target lane, an adaptation can take place of the vehicle speed and/or of the distance to the vehicle driving ahead in the momentary traffic lane. The object is a harmonious lane change and a simplified merging into the observed adjacent traffic lane.

If the traffic conditions with respect to the speed and the frequency of the passing vehicles in the adjacent lane are too irregular for being able to form a suitable mean speed value, a predetermined fixed value can, for example, be used for increasing or reducing the speed.

In principle, the invention relates to a traffic lane change between same-direction lanes. The driving direction in the adjacent lanes is detected, for example, by a distance sensor and/or information from a navigation system. If a change to a traffic lane in the opposite direction is detected, the measures suggested according to the invention are suppressed.

If, particularly in conjunction with taking into account country-related variants or, for example, country-related information from a navigation system, a differentiation is made between a change into the left traffic lane or a change into the right traffic lane, it can be detected whether a change is made to a faster or to a slower traffic lane. For example, in the case of right-hand traffic, it can basically be assumed that, when a change takes place to the left traffic lane, a faster vehicle speed is to be expected and, when a change takes place to the right traffic lane, a slower vehicle speed can be expected. The situation would be inverse with respect to the vehicle speed concerning the left and the right traffic lane if the information of the country-related variant, for example, in South Africa or Great Britain, were to indicate left-hand traffic.

Other objects, advantages and novel features of the present invention will become apparent from the following detailed description of the invention when considered in conjunction with the accompanying drawings.

BRIEF DESCRIPTION OF THE DRAWINGS

The drawing shows an embodiment of the invention. It illustrates a vehicle with a driving speed control system according to the invention on a three-lane road.

DETAILED DESCRIPTION OF THE PREFERRED EMBODIMENT

Figure 1:
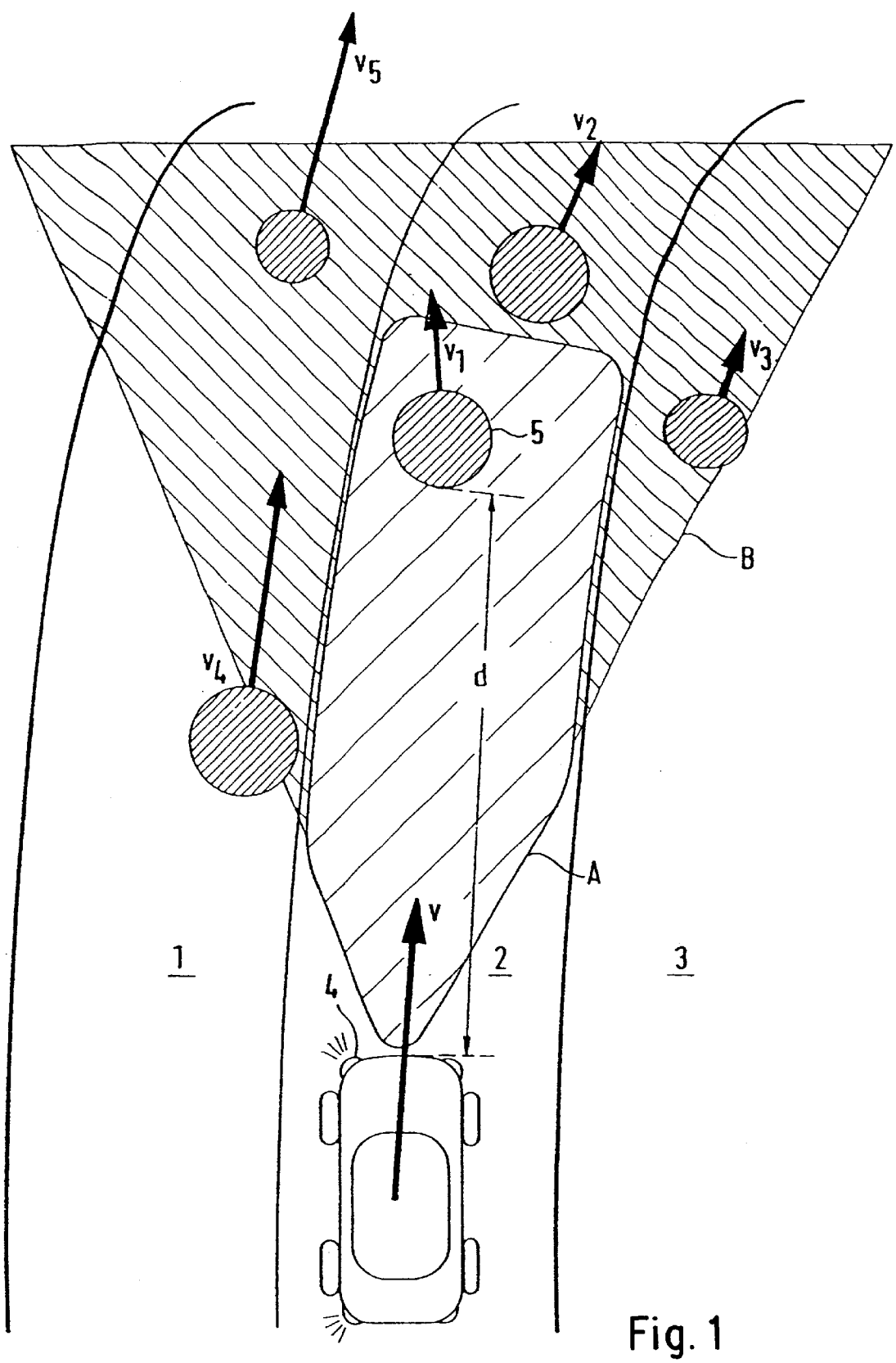

The illustrated road has the traffic lanes 1, 2 and 3 with a vehicle is moving in the center lane 2 at a vehicle speed v at a distance d from the vehicle 5 driving ahead. The distance sensor system, for example, a radar system, which is not shown here and is mounted on the vehicle, has a detection range B of the illustrated triangular shaped driving environment. Normally, only a lobe-shaped area A with an assumed traffic lane width is evaluated of this detection range B for determining the distance d from the vehicle 5 driving ahead.

According to the invention, the entire detection range B will now be further utilized such that a median speed of the vehicles driving in at least one adjacent lane 1 and/or 3 is detected. The other vehicles are schematically shown in the drawing in the form of dark circles with the speeds $v_1$ to $v_5$.

By using the distance sensor signals, the driving speed control system according to the invention estimates a median speed of the vehicles passing during a defined time period in an adjacent lane 1 or 3. In the illustrated embodiment, the median speed $v_6$ of the two vehicles in the left traffic lane 1 is $(v_4+v_5)/2$. By means of a relative speed comparison between the vehicle speed v and the respective speeds $v_4$ and $v_5$ in lane 1, the direction of the vehicles in lane 1 is also detected. By way of a turn signal 4,—in the illustrated example, a left turn signal—, the speed control system according to the invention recognizes that the left traffic lane 1 is the target lane in the case of a lane change. Since, in the illustrated embodiment, the mean speed $v_6$ in the left lane 1 is higher than the driving speed v, the driving speed v can be increased and the distance d can be reduced, for example, already when the intention of a lane change is recognized.

Likewise, when a change takes place to the right traffic lane 3, the vehicle speed v can be reduced.

This passing aid according to the invention, which is adapted to the situation, results in harmonious transitions in the case of driving speed control systems without a required intervention by the driver. As the result, the usefulness to the customer is increased because of a gain in comfort.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for distance-dependent driving speed control of an automobile having an electronic control unit, said method comprising the steps of:

detecting at least one signal indicating a traffic lane change or the intention to change the traffic lane from a first lane to a second lane;

generating at least one signal for estimating the mean speed of vehicles in the second traffic lane;

defining the automobile speed and/or distance to a vehicle driving ahead in said first lane, wherein said defined vehicle speed is substantially identical to said mean speed of said vehicles in said second lane.

2. The method according to claim 1, further including the step of determining the direction of said vehicles in said second lane.

3. The method according to claim 1, wherein said at least one signal for recognizing a traffic lane change or the intention to change the traffic lane change is one of a change to a left traffic lane and a change to a right traffic lane.

4. The method according to claim 3, wherein a determination is made between country-related information concerning one of left hand drive and right hand drive countries.

5. A distance-dependent driving speed control system for a motor vehicle having an electronic control unit, comprising:

means for recognizing a traffic lane change or the intention to change the traffic lane from a first traffic lane to a target traffic lane of said motor vehicle;

means for generating a signal to estimate the mean speed of vehicles in said second traffic lane;

means for defining the speed and/or distance from said motor vehicle to a second vehicle driving ahead in said first traffic lane when a traffic lane change or intention to change the traffic lane has been generated wherein said defined speed is substantially equal to said mean speed of vehicles in said second lane.

6. The distance-dependent driving speed control system according to claim 5, further including means for detecting the direction of vehicles in said second traffic lane.

7. The distance-dependent driving speed control system according to claim 5, further including means to differentiate between a change to a left hand traffic lane and a change to a right hand traffic lane.

8. The distance-dependent driving speed control system according to claim 7, further including means for differentiating between country-related variations of left and right hand driving systems.

* * * * *